United States Patent [19]

Cenegy

[11] Patent Number: 5,451,612
[45] Date of Patent: Sep. 19, 1995

[54] INTEGRAL SKIN POLYURETHANE

[76] Inventor: Louis F. Cenegy, 24496 Alta Vista Dr., Dana Point, Calif.

[21] Appl. No.: 107,508

[22] Filed: Aug. 17, 1993

[51] Int. Cl.$^6$ ................................. C08J 9/34
[52] U.S. Cl. ........................ 521/51; 521/125; 521/128
[58] Field of Search ............. 521/51, 125, 128

[56] References Cited

U.S. PATENT DOCUMENTS

| | | | |
|---|---|---|---|
| 3,694,530 | 9/1972 | Wolfe | 264/48 |
| 3,796,669 | 3/1974 | Kiritani et al. | 428/402.21 |
| 3,889,036 | 6/1975 | Preston | 428/383 |
| 3,914,511 | 10/1975 | Vassiliades | 503/206 |
| 3,989,767 | 11/1976 | Homma et al. | 525/280 |
| 4,246,392 | 1/1981 | Koike et al. | 528/64 |
| 4,305,991 | 8/1981 | Meyborg et al. | 428/318.8 |
| 4,444,704 | 4/1984 | Hira et al. | 264/45.5 |
| 4,501,873 | 2/1985 | Rasshofer | 528/48 |
| 4,517,313 | 5/1985 | Nakatani | 521/51 |
| 4,629,680 | 12/1986 | Iwasaki et al. | 430/288 |
| 4,650,608 | 3/1987 | Takeo et al. | 540/451 |
| 4,657,942 | 4/1987 | Iwasaki et al. | 522/16 |
| 4,740,531 | 4/1988 | Rasshofer | 521/167 |
| 4,763,133 | 8/1988 | Takemura et al. | 343/912 |
| 4,766,055 | 8/1988 | Kawabata et al. | 428/402.21 |
| 4,853,312 | 8/1989 | Yamada | 428/383 |
| 4,868,092 | 9/1989 | Kawabata et al. | 503/206 |
| 4,876,173 | 10/1989 | Maemoto et al. | 430/288 |
| 4,925,768 | 5/1990 | Iwasaki et al. | 430/271 |
| 4,965,171 | 10/1990 | Kawabata et al. | 430/288 |
| 4,997,707 | 3/1991 | Otawa et al. | 428/319.3 |
| 5,006,592 | 4/1991 | Oshima et al. | 524/504 |
| 5,057,544 | 10/1991 | Ho et al. | 521/51 |
| 5,106,534 | 4/1992 | Wason et al. | 252/350 |
| 5,110,643 | 5/1992 | Akao et al. | 428/35.9 |
| 5,112,879 | 5/1992 | Randall et al. | 521/155 |
| 5,132,329 | 7/1992 | Lynch et al. | 521/51 |
| 5,166,183 | 11/1992 | Franyutti et al. | 521/54 |
| 5,203,793 | 4/1993 | Lyden | 36/88 |
| 5,210,103 | 5/1993 | Valoppi et al. | 521/51 |
| 5,216,035 | 6/1993 | Harrison et al. | 521/51 |
| 5,252,618 | 10/1993 | Garcia et al. | 521/57 |

*Primary Examiner*—James J. Seidleck
*Assistant Examiner*—Terressa M. Mosley
*Attorney, Agent, or Firm*—Harness, Dickey & Pierce

[57] ABSTRACT

A process and a polymerization mixture for making integral skin polyurethane wherein Component A containing an isocyanate source is combined with Component B containing a polyol source mixture which includes a blowing agent and a polyurethane catalyst. The blowing agent comprises a carbonate source, and optionally water, an alum source and/or an acid source. The mixture is placed in a mold and the mold is closed. The isocyanate source and polyol source react and the carbonate source decomposes to produce carbon dioxide gas to form an integral skin polyurethane in the closed mold.

37 Claims, No Drawings

INTEGRAL SKIN POLYURETHANE

BACKGROUND OF THE INVENTION

This invention relates to an improved process for making integral skin polyurethane using a blowing agent comprising, in its simplest form, a carbonate or bicarbonate source with or without water. This blowing agent is combined with an isocyanate source, a polyol source and/or a third stream, and the polyol source, a polyurethane catalyst, the blowing agent and the isocyanate source are mixed and reacted to form a polyurethane material with a foamed interior and a tougher, more densely packed, outer skin layer that is formed integrally with the interior. The polyol source and/or third stream may be compounded with cross-linking agents, chain extenders, fillers, pigments, fire-retardants, UV-absorbers and the like.

It is well known that polyurethane may be prepared by the reaction of a polyisocyanate and a polyol in a closed mold. One type of polyurethane polymer include polyurethane compounds with foamed interiors and more compact integral outer skin layers. Compounds of this type, known as integral skin polyurethanes, are quite common and may be used to make a variety of products. Such compounds resemble vinyl or synthetic leather and are commonly used, for example, to make products such as arm rests and dashboards in automobiles.

In the past, integral skin polyurethane has been made from a polyisocyanate and a polyol using a catalyst to promote the reaction and FREON 11 halogenated hydrocarbons as the blowing agent which foams the polyurethane during the polymerization. Cross-linking agents, coloring agents, surfactants and/or plasticizers are frequently added to the mixture depending on the final product to be produced from the integral skin polyurethane. Although this technique for making integral skin polyurethane has previously worked well, environmental regulations have been passed and are now in place which prohibit the use of FREON 11 agent in the making of integral skin polyurethane. This has caused many manufacturers to change to FREON 141B halogenated hydrocarbon. However, this compound too will soon be banned as an environmental hazard. Pentane is an alternative compound which could be used as a blowing agent in the making of integral skin polyurethane. However, pentane is extremely volatile and highly flammable and therefore potentially quite dangerous. For this reason, the use of pentane as the blowing agent presents challenging safety problems.

This invention provides a solution to the problem of finding a safe, environmentally acceptable yet effective blowing agent for use in the process of making integral skin polyurethane materials. In particular, a carbonate source, such as baking powder or soda, with or without water can be used effectively as the blowing agent instead of FREON agents or pentane compounds to produce high quality integral skin polyurethane. Moreover, by using a bicarbonate source such as baking soda as the blowing agent, existing integral skin polyurethane molds and molding techniques and methods can be used.

It is, therefore, a principal object of this invention to provide an improved process for making integral skin polyurethane which can be carried out without using a FREON agent or pentane compound as the blowing agent.

It is a further object of this invention to provide an improved process for making integral skin polyurethane which uses a carbonate or bicarbonate, optionally with water, as the blowing agent.

SUMMARY OF THE INVENTION

This invention is embodied in a process for making integral skin polyurethane. The process comprises combining a first component ("Component A") with a second component ("Component B"), and optionally with a third stream to form a prepolyurethane mixture wherein the first component comprises an isocyanate source, the second component comprises a polyol source, and the optional third stream can comprise pigment, surfactant, polyurethane catalyst, cross linking agents and the like. In accordance with the invention, the first component, the second component and/or the third stream can contain the blowing agent which comprises a carbonate source, and, optionally, water. The amount of carbonate source used is equivalent to about 0.5 to about 30 wt %, preferably about 1 to about 20 wt %, of the second component, and the amount of water used is equivalent to about zero to about 5 wt %, and preferably about 0.05 to about 2 wt %, of the first and second components combined. The prepolyurethane mixture is rapidly formed or combined, poured or injected into a mold, the mold is closed, and the isocyanate source and polyol source react and the carbonate source decomposes to form carbon dioxide gas in the closed mold to form an integral skin polyurethane.

This invention is also adapted to be embodied in a polymerization mixture used in making integral skin polyurethane. The mixture comprises a first component ("Component A") comprising an isocyanate source and a second component ("Component B") comprising a polyol source and, optionally, a third stream, a catalyst, a blowing agent comprised of a carbonate source and, optionally, water. The amount of carbonate source used is equivalent to about 0.5 to about 30 wt %, and preferably about 1 to about 20 wt %, of the second component, and the amount of water used is equivalent to about zero to about 5 wt % (i.e., up to about 5 wt %), and preferably about 0.05 to about 2 wt %, of the first and second components combined.

This invention is further adapted to be embodied in a blowing agent comprised minimally of a carbonate source and which may also include water, an alum source and/or an acid source.

DETAILED DESCRIPTION OF THE PREFERRED EMBODIMENTS OF THE INVENTION

The present invention provides a process and a polymerization mixture for making integral skin polyurethane which is a polyurethane composition that has a foamed interior and a tougher, more densely packed, outer skin layer that is formed integrally with the foamed interior. The integral skin polyurethane is made using a blowing agent comprising at least a carbonate source and optionally water, alum and/or a weak acid source. In making integral skin polyurethane, two components, which will be designated herein as Component A and Component B, and optionally a third stream, are mixed thoroughly into a mixture and immediately poured or injected into a mold apparatus, the mold is closed and the mixture reacts to form molded integral skin polyurethane.

Component A is comprised of an isocyanate source (sometimes referred to as an "isocyanate urethane precursor") which includes at least one compound containing the univalent radical -NCO. Component A may include the blowing agent of this invention or one more of the blowing agent constituents. A wide variety of known isocyanate compounds may be used in this invention including esters of isocyanic acid. Any of the conventional polyisocyanates known in the art may be employed in the present invention. Examples of isocyanate sources for use with this invention include polyvalent isocyanates including diisocyanates, such as m-phenylenediisocyanate; p-phenylenediisocyanate; 2,6-trichloroethylenediisocyanate; 2,4-trichloroethylenediisocyanate; naphthalene-1,4-diisocyanate; diphenylmethane-4,4'-diisocyanate; 3,3'-dimethoxy-4,4'-biphenyl-diisocyanate; 3,3'-dimethyldiphenylmethane-4,4'-diisocyanate; trimethylhexamethylene diisocyanate (TMDI); xylenediisocyanate including xylylene-1,4-diisocyanate; 4,4'-diphenylpropanediisocyanate; trimethylenediisocyanate; hexamethylenediisocyanate (HMDI); propylene-1,2-diisocyanate; butylene-1,2-diisocyanate; cyclohexanediisocyanate; cyclohexylene-1,2-diisocyanate; cyclohexylene-1,4-diisocyanate; isophorone-diisocyanate (IPDI), dicyclohexylmethane-4,4'-diisocyanate, and the like; 2,4-tolylenediisocyanate (2,4-TDI); 2,6-tolylenediisocyanate (2,6-TDI); mixtures of 2,4-TDI and 2,6-TDI; dimer and trimer of 2,4-TDI; metaxylylenediisocyanate (MXDI); 4,4'-biphenyl-diisocyanate; diphenylether-4,4'-diisocyanate; 3,3'-ditoluene-4,4'-diisocyanate (TODI); dianisidinediisocyanate (DADI);4,4'-diphenylmethanediisocyanate (MDI); 3,3'-diethyl-4,4'-diphenylmethanediisocyanate; 1,5-naphthalene diisocyanate (NDI); diisothiocyanates, such as p-phenylenediisothiocyanate; xylene-1,4-diisothiocyanate; ethylidine-diisothiocyanate and the like; triisocyanates, such as triphenylmethane-triisocyanate and the like including 4,4', 4"-triphenylmethanetriisocyanate; toluene-2,4,6-triisocyanate and the like; tetraisocyanates, such as 4,4'-dimethyldiphenyl methane-2,2', 5,5'-tetraisocyanate and the like; isocyanate prepolymers, such as an adduct of trichloroethylenediisocyanate with hexanetriol; an adduct of hexamethylene-diisocyanate with hexane triol; an adduct of trichloroethylenediisocyanate with hexane triol; an adduct of trichloroethylenediisocyanate with trimethylol propane, and the like. The polyisocyanates may also be used in the form of their derivatives, e.g., the reaction products with phenols, alcohols, amines, ammonia, bisulphite, HCl etc., and the polyester based isocyanate terminated prepolymer and IPDI. Individual examples of these are phenol, cresols, xylenol, ethanol, methanol, propanol, isopropanol, ammonia, methylamine, ethanolamine, dimethylamine, aniline and diphenylamine. Relatively high molecular weight addition products, e.g., of polyisocyanates with polyalcohols such as ethylene glycol, propylene glycol, trimethylolakanes or glycerol may also be used.

Typical isocyanate sources include the RUBINATE 1209, RUBINATE 1234, RUBINATE 1680, RUBINATE 1790, RUBINATE 1820 and RUBINATE M brand isocyanate materials supplied by ICI Americas, Inc. which contain 4,4'-diphenylmethane-diisocyanate ("MDI"), with modified MDI; 2,4'-diphenylmethane-diisocyanate ("2,4'-MDI"); polymethylene poly-propylene ester isocyanic acid ("polymeric MDI"); and/or other MDI isomers and oligomers. Another isocyanate source is DESMODUR W brand dicyclohexyl methane-4,4'-diisocyanate by Miles Corporation.

These compounds are merely illustrative examples of isocyanate sources that may be used in connection with this invention, and it is to be understood that any known isocyanate source that is acceptable in the making of integral skin polyurethane may be used.

Component B is comprised of a polyol source (sometimes referred to as a "polyol urethane precursor") which may be an aliphatic or aromatic polyhydroxy compound. Component B may include the blowing agent of this invention or one or more of the blowing agent constituents, a catalyst, a surfactant, pigments, fire retardants, and/or the like.

Examples of aliphatic polyhydroxy compounds for use with this invention are diols, such as ethylene glycol, diethylene glycol, triethylene glycol, tetraethylene glycol, neopentyl glycol, propylene glycol, 1,4-butanediol and the like; triols, such as trimethylolethane, trimethylolpropane, glycerol and the like; higher polyols, such as pentaerythritol, tripentaerythritol and the like; and polyhydroxycarboxylic acids. Examples of aromatic polyhydroxy compounds are hydroquinone, resorcin, catechol, pyrogallol and the like.

Esters of aliphatic polyhydroxy compounds and unsaturated carboxylic acids may also be used. Examples are acrylates, such as ethylene glycol diacrylate; triethylene glycol diacrylate; tetramethylene glycol diacrylate; trimethylolpropane triacrylate; trimethylolethane triacrylate; pentaerythritol diacrylate; pentaerythritol triacrylate; pentaerythritol tetraacrylate; dipentaerythritol tetraacrylate; dipentaerythritol pentaacrylate; dipentaerythritol hexaacrylate; tripentaerythritol octaacrylate; glycerol diacrylate; methacrylates, such as triethylene glycol dimethacrylate; tetramethylene glycol dimethacrylate; trimethylolpropane trimethacrylate; trimethylolethane trimethacrylate; pentaerythritol dimethacrylate; pentaerythritol trimethacrylate; pentaerythritol tetramethacrylate; dipentaerythritol dimethacrylate; dipentaerythritol trimethacrylate; dipentaerythritol tetramethacrylate; tripentaerythritol octamethacrylate; ethylene glycol dimethacrylate; 1,4-butanediol dimethacrylate; sorbitol tetramethacrylate and the like; itaconates, such as ethylene glycol diitaconate; propylene glycol diitaconate; 1,2-butanediol diitaconate; tetramethylene glycol diitaconate; pentaerythritol triitaconate and the like; crotonates such as ethylene glycol dicrotonate; diethylene glycol dicrotonate; pentaerythritol tetracrotonate and the like; and maleates, such as ethylene glycol dimaleate; triethylene glycol dimaleate; pentaerythritol dimaleate and the like.

Aliphatic and aromatic polyvalent alcohols, hydroxy polyesters, hydroxy polalkylene ethers and the like may also be used as the polyol source in the present invention. The aromatic and aliphatic polyvalent alcohols include, for example, catechol; resorcinol; hydroquinone; 1,2-dihydroxy-4-methylbenzene; 1,3-dihydroxy-5-methylbenzene; 3,4-dihydroxyl-1-methylbenzene; 2,4-dihydroxyethylbenzene; 1,3-naphthalenediol;1,5-naphthalenediol; o, o'-biphenol; p,p'-biphenol; 1,1'-bi-2-naphthol; bisphenol A; 2,2'-bis(4-hydroxyphenyl)-isopentane; 1,1'-bis(4-hydroxyphenyl)cyclopentane; 1,1'-bis(4-hydroxyphenyl)-cyclohexane;2,2'-bis(4-hydroxy-3-methylphenyl)-propane; bis-(2-hydroxyphenyl)-methane; xylenediol; ethylene glycol; 1,3-propylene glycol; 1,5-pentanediol; 1,6-heptanediol; 1,7-heptanediol; 1,8-octanediol; 1,1,1-trimethylolpropane; hexanetriol; pentaneerythritol; sorbitol and the like; the hydroxy polyesters are obtained from polyvalent carboxylic acids and polyvalent alcohols are condensates of alkyleneoxides with polyvalent alcohols, i.e., hydroxypolyalkylene ethers.

Similarly, polyol compounds used in the present invention may be any of the conventional ones exemplified by aliphatic polyesterglycols such as polyethylene adipate; polybutylene adipate; polypropylene adipate and the like with extended chain length obtained by the condensation reaction between an aliphatic glycol and a dicarboxylic acid; polyalkyleneether glycols such as polypropyleneether glycol, tetramethyleneether glycol and the like obtained by the ring-opening polymerization of cyclic ethers such as ethylene oxide, propylene oxide, tetrahydrofuran and the like; polyesterglycols obtained by the ring-opening polymerization of $\epsilon$-caprolactone; diol compounds obtained by converting the terminal groups in polybutadienes into hydroxy groups; copolymers of two or more kinds of alkylene oxides; copolymers of two or more kinds of glycols and a dicarboxylic acid; polyester polyols obtained by the co-condensation of a dicarboxylic acid and a polyol such as aromatic glycols, long-chain diols, glycerin, trimethylolpropane and the like; and polyether polyols obtained by the ring-opening polymerization of a cyclic ether such as ethylene oxide, propylene oxide and tetrahydrofuran with a polyol such as glycerin or trimethylolpropane as the initiator.

Typical polyol sources include ARCOL 11–34 Polyol brand polyethylene-polyproylene glycol glyceryl ether, ARCOL 34–28 polyol brand alkenyl modified oxyalkylene polymer (both supplied by ARCO Chemical Company), VORANOL 240–360 POLYOL brand polyol supplied by Dow Chemical U.S.A. and MULTRANOL 9151 brand poly(oxyalkylene) polyol supplied by Miles Corporation.

These compounds are merely illustrative examples of polyol sources that may be used in connection with this invention, and it is to be understood that any known polyol source that is acceptable in the making of integral skin polyurethane may be used.

In accordance with the invention, the blowing agent acts as a carbon dioxide source to cause the mixture of Components A and B to foam and expand to fill a closed mold cavity. The blowing agent of this invention comprises a carbonate source in the form of a salt, and, optionally, water. As used in the specification and claims herein, the term "carbonate source" is intended to cover a bicarbonate source as well. Baking powder or baking soda, for example, may be used as the carbonate source. Other carbonate salts which may be used include: lithium bicarbonate, lithium carbonate, sodium bicarbonate, sodium carbonate, potassium bicarbonate, and potassium carbonate. However, it is believed that any carbonate or bicarbonate salt, such as ammonium carbonate and ammonium bicarbonate, that forms carbon dioxide gas during the exothermic reaction of Component A and Component B, can be used in the present invention. Sodium bicarbonate or potassium bicarbonate because of their availability and reactivity are the preferred carbonate sources for use in this invention.

The addition of water to the blowing agent is preferred. It is believed that water lowers the temperature at which the carbonate source liberates carbon dioxide. However, the process will operate satisfactorily without water.

The blowing agent may optionally contain an alum and/or a weak acid source. The addition of an alum source appears to provide a better integral skin polyurethane and the weak acid source appears to accelerate the foaming reaction of the carbonate source.

The alum source may be a compound of the general formula $MAl(SO_4)_2 \cdot 12H_2O$ where M is an alkali metal (except lithium), or magnesium, calcium, ammonium, silver or thallium. Examples of preferred alum sources for this invention include: aluminum sodium sulfate, aluminum potassium sulfate and aluminum ammonium sulfate.

The class may be even more general as the aluminum may be substituted by $Fe^{+++}$, $Cr^{+++}$, $Mn^{+++}$, $Ti^{+++}$, and other $3+$ ions. The tendency of the alkali metals to form alums increases as the atomic weight increases; cesium forms more alums than the other alkali metals and these are in general less soluble.

It is believed that the use of the alum in baking powder furnishes acid to cause the liberation of carbon dioxide. The same reaction is used in some fire extinguishers, in which solutions of alum are caused to react with solutions of sodium bicarbonate containing organic substances capable of forming very stable foams. The amount of alum used is equivalent to 20 wt % or less of the carbonate source.

The acid source may be salts of mineral acids, such as calcium, magnesium or strontium salts, such as monobasic calcium phosphate. Weak organic acids may also be used, such as calcium tartrate, calcium citrate and calcium magnesium acetate. The amount of acid source used is equivalent to 20 wt % or less of the carbonate source.

The blowing agent may be contained in Component A and/or Component B and/or the third stream, if a third stream is employed. Optionally, the blowing agent constituents can be parceled out between Component A, Component B and/or the third stream. For example, Component A can include the carbonate source, Component B can include water, and the third stream can include an alum source and weak acid source.

In a two component system, in addition to the polyol source, Component B also usually comprises a polyurethane catalyst used to promote the reaction of the isocyanate source with the polyol. The catalyst can be an amine, organometallic compound, an organic acid salt of a metal, a tertiary phosphine, an alkali metal compound, radical forming agents, and like catalyst used in forming polyurethanes.

Amines which may be used as the catalyst in the present invention include, for example, trialkylamines, such as triethylene amine; N,N,N',N'-tetramethyl-1,3-butanediamine; amino alcohols such as dimethyl ethanolamine; ester amines such as ethoxylamine, ethoxyldiamine, bis-(diethylethanolamine)adipate; triethylenediamine; cyclohexylamine derivatives such as N,N-dimethylcyclohexylamine; morpholine derivative such as N-methylmorpholine; and piparizine derivatives such as N,N'-diethyl-2-methylpiparizine N,N'-bis-(2-hydroxypropyl)-2-methylpiparizine, and the like.

Metals of organometallic compounds include, for example, tin, lead, bismuth, cadmium, cobalt, aluminum, potassium, chromium and zinc. Among them, typical embodiments of organotin compounds are dibutyltin laurate and dibutyltin(2-ethylhexoate) and the like. As for the various organic acid salts of metals, there are, for example, organic acid salts of oleic acid, naphthenic acid, caproic acid, octyl acid, and most other organic acids with tin, lead, bismuth, cadmium, cobalt, aluminum, potassium, chromium and zinc.

Examples of organic acid salts of tin are stannous oleate, tin 2-ethylcaproate, tin naphthoate, tin octylate and the like.

Examples of tertiary phosphines include trialkyl phosphine, dialkylbenzyl phosphine and the like.

Examples of alkali metal compounds include alkali metal hydroxides or fatty acid salts.

As the radical-forming agent, there are, for example, benzoyl peroxide, lauroyl peroxide, azobisisobutyronitrile and the like.

These catalysts may be used singly or in combination, and it may be more effective to use an amine together with an organometallic compound or an organic acid salt of a metal.

In a two component system, Component B may also include additives used in integral skin polyurethanes, such as fillers, cross linking agents, plasticizers, pigments, fire retardants, surfactants, and the like.

In a three stream system, the third stream normally comprises the catalyst, and optionally a surfactant, plasticizers, pigments, fire retardants, and the like. The cross linking agents are either included in Component B and/or the third stream.

Conventional cross linking agents used in the manufacture of integral skin polyurethane are used in the present invention in the amounts customarily used in the manufacture of integral skin polyurethanes, including 1,4-butanediol; diethyleneglycol; and similar diols.

Conventional surfactants used in the manufacture of integral skin polyurethane are used in the present invention in the amounts customarily used in the manufacture of integral skin polyurethanes, including non-hydrolyzable silicone surfactant.

The amount of carbonate source used is equivalent to about 0.5 to about 30 wt % of Component B, preferably about 1 to about 20 wt % of Component B. The amount of water used is equivalent to about zero to about 5 wt % of Components A and B combined, preferably about 0.05 to about 2 wt % of Components A and B combined. The amount of polyol source used is equivalent to about 30 to about 80 wt % of Components A and B combined, preferably about 40 to about 60 wt % of Components A and B combined.

The amount of isocyanate source used is equivalent to about 15 to about 70 wt % of Components A and B combined, preferably about 20 to about 50 wt % of Components A and B combined.

Components A and B, and the third stream in a three stream system, are rapidly and thoroughly mixed and placed, i.e. poured or injected, into an appropriate mold wherein the reactions take place in a now closed mold. It is important to note that no external heat need be applied to the mold or mixture to initiate the reactions; however, preferably, the mold is prewarmed. It is believed that three (3) separate reactions occur in the mold: (1) isocyanate reacts with polyol, and cross linking agents, which then polymerizes to form polyurethane; (2) isocyanate reacts with water to produce carbon dioxide; and (3) the carbonate source decomposes and/or reacts with water to produce carbon dioxide. When Components A and B are mixed, sufficient heat is generated from reaction (1) to cause the carbonate source to decompose or react with water if present to yield carbon dioxide. When reaction (3) starts, carbon dioxide is rapidly produced causing the partially polymerized mixture of Components A and B, and the third stream if present, to foam and expand to fill the closed mold cavity.

It is believed that reaction (3) starts before isocyanate begins to react with water and before reaction (1) has proceeded very far while the interior surface of the mold cavity is still cool. Reaction (1) begins first but the rate of formation of polyurethane is slower than the rate of formation of carbon dioxide in reaction (3), especially in the region adjacent the mold surface where the polymer is kept relatively cool by the cool interior surface of the mold cavity. As the polyurethane is forming, the foaming action of reaction (3) forms relatively weak cells of partially polymerized material which rupture and/or are compressed on the interior surface of the mold cavity to form a continuous skin. As the reactions progress, the mixture of Components A and B, and the third stream constituents, if present, in the mold cavity heats up, and the rate of formation of polyurethane increases. By the time reaction (2) becomes meaningful, reaction (1) (the formation of polyurethane) has progressed to the point where a continuous non-foamed outer skin of polyurethane has been formed and the polyurethane polymer molecules are forming strong, rupture proof cells. Reaction (2) produces carbon dioxide which can only form small microcells of carbon dioxide within the strong, substantially polymerized continuous skin.

By using a carbonate source, and, optionally, water, as the blowing agent, existing molds and molding techniques and methods for making integral skin polyurethane can be used.

To further illustrate the invention, the following examples are provided. It is to be understood, however, that these examples are for illustrative purposes only and that other variations and combinations of reactants and compounds can be used.

EXAMPLE 1

INTEGRAL SKIN FLEXIBLE FOAM

An integral skin polyurethane was prepared by rapidly and thoroughly mixing Component "A" with Component "B":

| Component "A" | |
|---|---|
| 40 wt % | 4,4'-Diphenylmethane diisocyanate, 2,4 diphenylmethane diisocyanate (MDI) and modified MDI Blend |

| Component "B" | |
|---|---|
| 25.45 wt % | Polyethylene-polypropylene and glycol glyceryl ether |
| 23.0 | Trifunctional poly (oxyalkylene) polyol containing 20 wt % polyurea in dispersion |
| 5.7 | 1,4-butanediol |
| 0.85 | $H_2O$ |
| 5.0 | Sodium Bicarbonate |

The resulting mixture was rapidly poured into an open mold, and the mold was closed to permit the reactants to form an integral skin flexible polyurethane foam.

The process can be carried out by employing the sodium bicarbonate in Component A.

EXAMPLE II

INTEGRAL SKIN FLEXIBLE FOAM

An integral skin polyurethane was prepared by reacting Component "A" with Component "B":

| Component "A" | | |
|---|---|---|
| 30.7 wt % | | Prepolymer made of combining modified liquid 4,4,Diphenylmethane diisocyanate and |
| 9.3 | | Polyethylene-polypropylene Glycol Glyceryl ether |
| Component "B" | | |
| 25.4 wt % | | Polypropylene glycol, ethylene oxide Capped triol 4800 molecular weight |
| 22.0 | | Alkenyl modified oxyalkylene polymer |
| 4.2 | | Diethylene glycol |
| 1.7 | | Ethylene glycol |
| 0.3 | | Triethylenediamine in glycol solution |
| 0.4 | | $H_2O$ |
| 6.0 | | Commercial baking powder comprising substantially of sodium bicarbonate, corn starch with minor amount of Sodium Aluminum Sulfate, Acid phosphate of calcium |

The Component "A" and Component "B" mixture was rapidly and thoroughly mixed and poured into a mold which was subsequently closed. The components react in the mold to form integral skin flexible polyurethane foam.

The process can also be carried out by employing the baking powder in Component B rather than Component A.

In a three stream system, the third stream can consist of the diethylene glycol, ethylene glycol, triethylenediamine in glycol colution, water and the commercial baking powder.

EXAMPLE III

INTEGRAL SKIN RIGID FOAM

An integral skin polyurethane was prepared by reacting Component "A" with the mixture of Component "B":

| Component "A" | | |
|---|---|---|
| 47 wt % | | Polymethylene polyphenylene ester, Isocyanic Acid ("polymeric" MDI) contains: 4,4 Diphenylmethane-diisocyanate and other MDI Isomers and oligomers |
| Component "B" | | |
| 38 wt % | | Polymer of propylene oxide and Sucrose blend with Polymer of propylene oxide and glycerol |
| 7.0 | | Poly (propylene glycol) |
| 0.5 | | Triethylenediamine in glycol solution |
| 0.5 | | $H_2O$ |
| 0.5 | | Polyalkyleneoxide methylsiloxane copolymer |
| 6.5 | | Sodium Bicarbonate |

The mixture of Component "A" and Component "B" was rapidly and thoroughly mixed and poured into a mold apparatus. The mold was immediately closed and the components reacted to form integral skin rigid polyurethane foam.

The process can be carried out by employing the sodium bicarbonate in Component A rather than Component B.

EXAMPLE IV

INTEGRAL SKIN MICROCELLULAR FLEXIBLE FOAM

An integral skin polyurethane product was prepared by reacting Component "A" with the mixture of Component "B":

| Component "A" | | |
|---|---|---|
| 55 wt % | | Modified Diphenylmethane diisocyanate (MDI) prepolymer with saturated polyester polyol |
| Component "B" | | |
| 38.2 wt % | | Saturated polyester polyol |
| 4.7 | | Ethylene glycol |
| 0.05 | | Tertiary amine/Glycol Mixture |
| 0.01 | | Organotin Catalyst |
| 0.04 | | $H_2O$ |
| 2.0 | | Sodium bicarbonate |

The resulting mixture was rapidly poured into a mold. The mold was closed and the components reacted to form integral skin microcellular flexible polyurethane foam.

The process can be carried out by employing the sodium bicarbonate in Component A rather than Component B.

EXAMPLE V

The process of Example I can be repeated except that the mixture also includes 0.04 wt % of acid phosphate of calcium as an acid source.

EXAMPLE VI

The process of Example I can be repeated except that employing 0.08 wt % of sodium aluminum sulfate in the mixture.

EXAMPLE VII

The process of Example III can be repeated except that the mixture will be compounded without water.

EXAMPLE VIII

The process of Example III can be repeated except that the mixture is compounded with 5 wt % of carbon black as a black pigment.

It should be readily apparent from the foregoing description including the examples that a process and a polymerization mixture for making integral skin polyurethane using a carbonate source and water as the blowing agent instead of a freon or pentane compound has been disclosed. Although embodiments of the invention have been illustrated and described, it is to be understood that various changes and modifications may be made without departing from the spirit and scope of the invention, as defined by the appended claims.

I claim:

1. A process for making integral skin polyurethane comprising:
   combining and rapidly and thoroughly mixing a first component comprising an isocyanate source, a second component comprising a polyol source, a polyurethane catalyst and a blowing agent comprising a carbonate source to form a prepolyurethane mixture, the amount of carbonate source used being equivalent to about 0.5 to about 30 weight percent of the second component;
   placing said mixture in a mold;
   closing the mold; and
   said mixture reacting in the closed mold to produce integral skin polyurethane.

2. The process according to claim 1 wherein said blowing agent includes water.

3. The process according to claim 1 wherein the amount of said carbonate source employed in the process is equivalent to about 1 to about 20 wt % of Component B.

4. The process according to claim 1 wherein the blowing agent includes water in an amount equivalent to about 5 wt % or less of Component A and Component B combined.

5. The process according to claim 1 wherein said blowing agent includes an alum source.

6. The process according to claim 1 wherein said blowing agent includes an acid source.

7. The process according to claim 2 wherein the blowing agent includes an alum source.

8. The process according to claim 2 wherein the blowing agent includes an acid source.

9. The process according to claim 1 wherein the isocyanate source constitutes about 15 to about 70 wt % of said mixture.

10. The process according to claim 1 wherein said polyol source constitutes about 30 to about 80 wt % of said mixture.

11. The process according to claim 1 wherein said carbonate source is a bicarbonate or carbonate salt that will form carbon dioxide gas during the reaction of said mixture.

12. The process according to claim 11 wherein said carbonate source is an alkali metal bicarbonate salt.

13. The process according to claim 12 wherein the carbonate source is sodium bicarbonate.

14. The process according to claim 12 wherein the carbonate source is potassium bicarbonate.

15. The process according to claim 5 wherein the alum source is aluminum sodium sulfate, aluminum potassium sulfate or aluminum ammonium sulfate.

16. The process according to claim 6 wherein the acid source is monobasic calcium phosphate, calcium tartrate, calcium citrate or calcium magnesium acetate.

17. The process according to claim 1 wherein the blowing agent is included with Component A.

18. The process according to claim 1 wherein the blowing agent is included with Component B.

19. The process according to claim 1 wherein said mixture comprises Component A, Component B and a third stream; the third stream comprising of a polyurethane catalyst and the blowing agent.

20. The process according to claim 19 wherein the amount of carbonate source used is equivalent to about 1 to about 20 wt % of Component B.

21. The process according to claim 19 wherein the blowing agent includes water in an amount equivalent to about 0.05 to about 2 wt % of Component A and Component B.

22. A polymerization mixture for making integral skin polyurethane comprising;
a component A comprising an isocyanate source;
a component B comprising a polyol source;
a polyurethane catalyst; and
a blowing agent comprising a carbonate source the amount of carbonate source being equivalent to about 0.5 to about 30 wt. % of component B.

23. The polymerization mixture according to claim 22 wherein the blowing agent includes water.

24. The process according to claim 22 wherein the blowing agent includes an alum source.

25. The polymerization mixture according to claim 22 wherein the blowing agent includes an acid source.

26. The polymerization mixture according to claim 22 wherein the blowing agent includes an alum source and an acid source.

27. The polymerization mixture according to claim 22 wherein the isocyanate source constitutes about 15 to about 70 wt % of said Component A and Component B combined.

28. The polymerization mixture according to claim 22 wherein the polyol constitutes about 30 to about 80 wt % of said Component A and Component B combined.

29. The polymerization mixture according to claim 22 wherein the carbonate source is a bicarbonate or carbonate salt that will form carbon dioxide gas during reaction of said mixture.

30. The polymerization mixture according to claim 29 wherein the carbonate source is an alkali metal bicarbonate.

31. The polymerization mixture according to claim 30 wherein said carbonate source is sodium bicarbonate.

32. The polymerization mixture according to claim 30 wherein said carbonate source is potassium bicarbonate.

33. The polymerization mixture according to claim 26 wherein the alum source is selected from the group consisting of aluminum sodium sulfate, aluminum potassium sulfate and aluminum ammonium sulfate.

34. The polymerization mixture according to claim 26 wherein the acid source is selected from the group consisting of monobasic calcium phosphate, calcium tartrate, calcium citrate and calcium magnesium acetate.

35. The process according to claim 1 wherein the blowing agent includes water in an amount equivalent to about 0.05 to about 2 wt. % of Component A and Component B combined.

36. The polymerization mixture according to claim 22 wherein the blowing agent includes water in an amount up to about 5 wt. % of Component A and Component B combined.

37. The polymerization mixture according to claim 23 wherein the mount of water used is equivalent to about 0.05 to about 2 wt. % of Component A and Component B combined.

* * * * *

UNITED STATES PATENT AND TRADEMARK OFFICE
CERTIFICATE OF CORRECTION

PATENT NO. : 5,451,612

DATED : September 19, 1995

INVENTOR(S) : Louis F. Cenegy

It is certified that error appears in the above-identified patent and that said Letters Patent is hereby corrected as shown below:

ON TITLE PAGE UNDER U.S. PATENT DOCUMENTS, REFERENCE 4,305,991

"8/1981" should be --12/1981--

Col. 6, line 7, "MA1(SO$_4$)$_2$. 12H$_2$O" should be --MA1(SO$_4$)$_2$•12H$_2$O--

Col. 12, line 51, "mount" should be --amount--

Signed and Sealed this

Twelfth Day of March, 1996

Attest:

BRUCE LEHMAN

Attesting Officer

Commissioner of Patents and Trademarks